June 10, 1947.
C. G. TRIMBACH
2,421,858
SHOCK ABSORBING GUN MOUNT
Filed Dec. 14, 1934
4 Sheets-Sheet 1
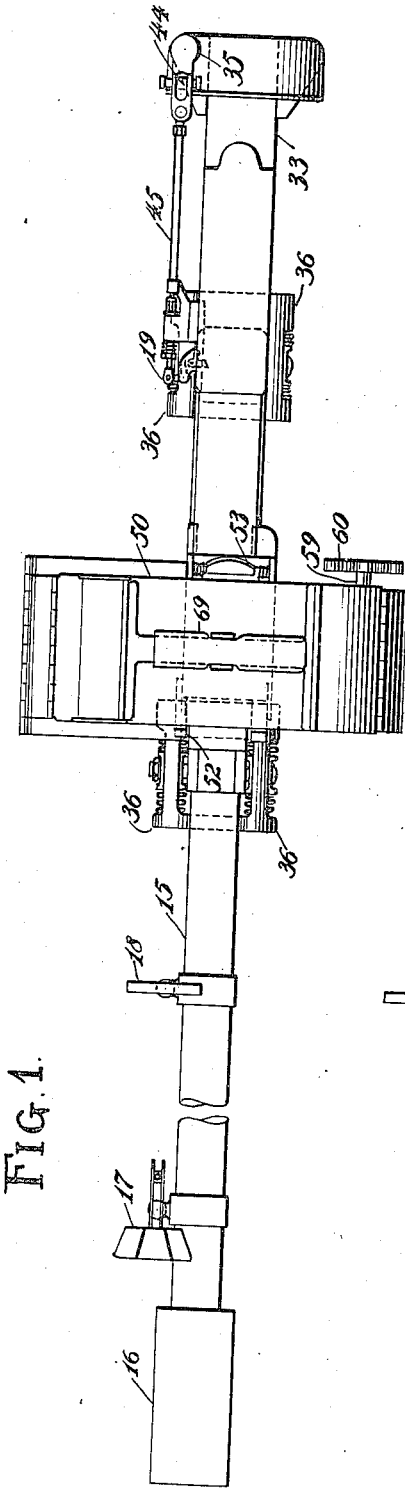
Fig. 1.
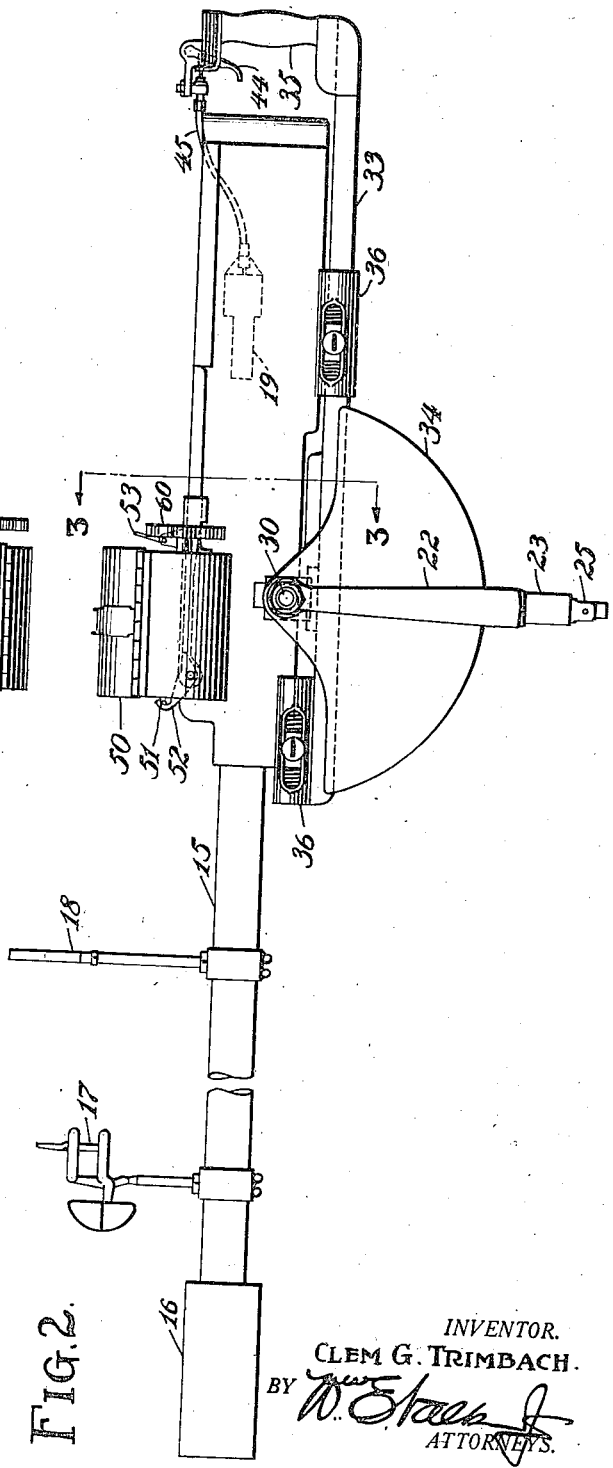
Fig. 2.
INVENTOR.
CLEM G. TRIMBACH.
BY 
ATTORNEYS.

June 10, 1947. C. G. TRIMBACH 2,421,858
SHOCK ABSORBING GUN MOUNT
Filed Dec. 14, 1934 4 Sheets-Sheet 3
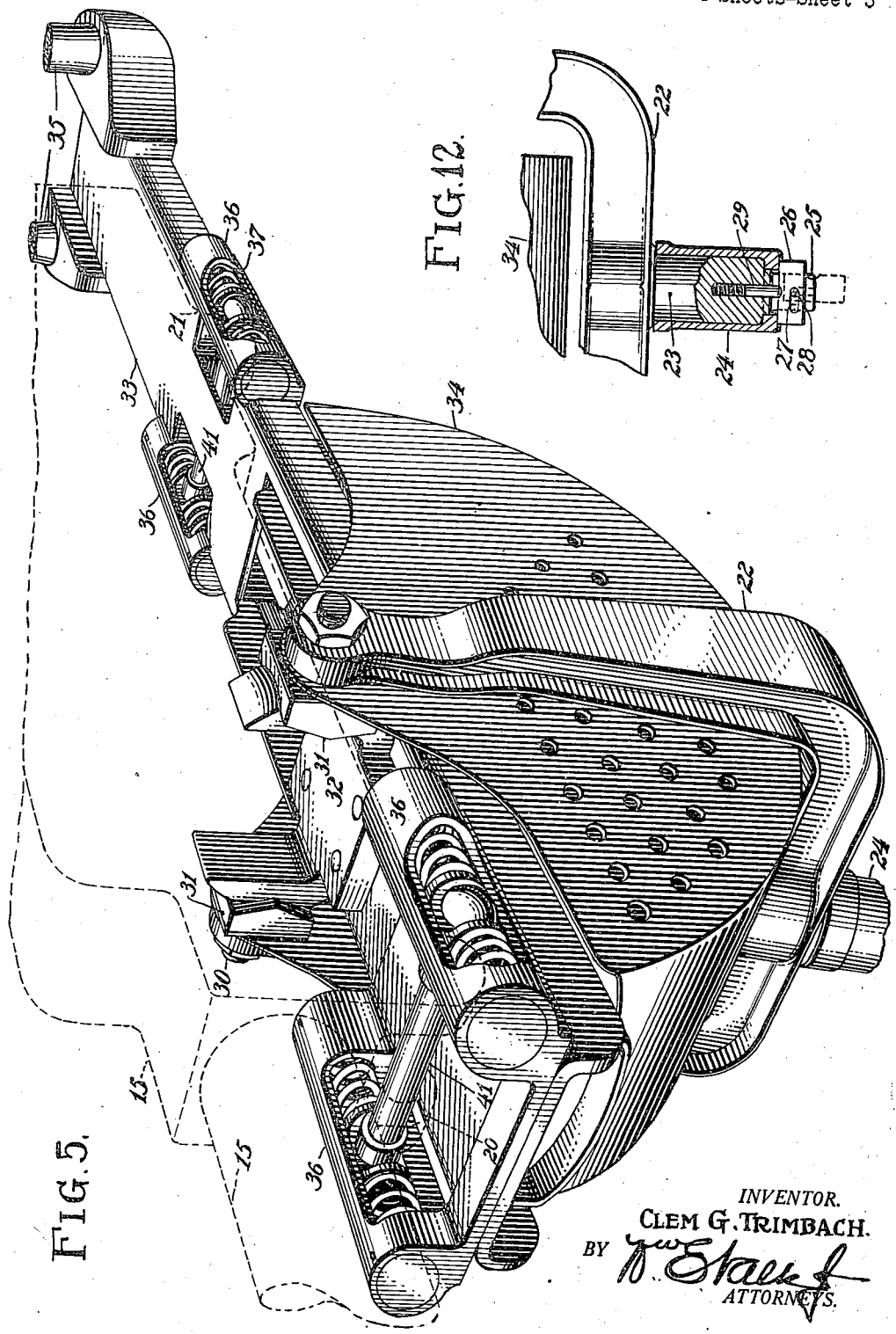
INVENTOR.
CLEM G. TRIMBACH.
BY
ATTORNEYS.

June 10, 1947.   C. G. TRIMBACH   2,421,858
SHOCK ABSORBING GUN MOUNT
Filed Dec. 14, 1934   4 Sheets-Sheet 4
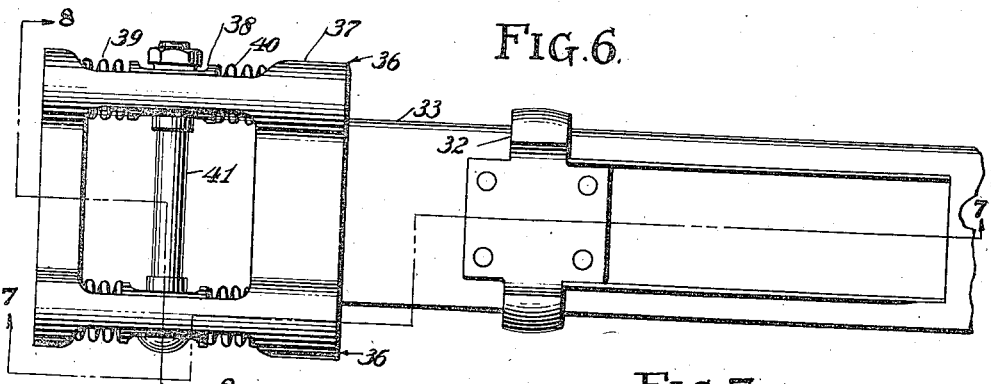
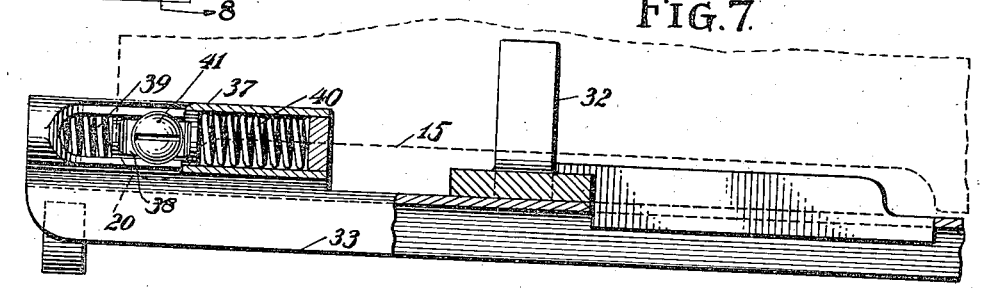
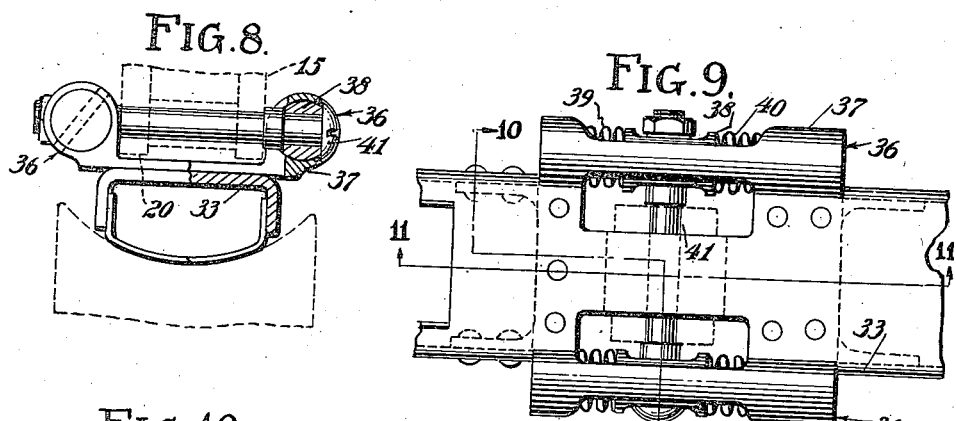
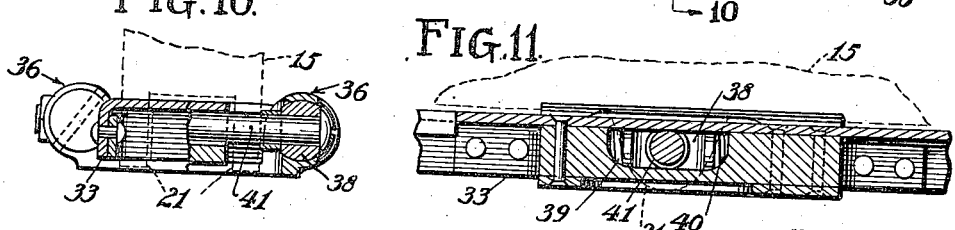
INVENTOR.
CLEM G. TRIMBACH.
BY
ATTORNEYS.

Patented June 10, 1947

2,421,858

UNITED STATES PATENT OFFICE 2,421,858

SHOCK ABSORBING GUN MOUNT

Clem G. Trimbach, Kenmore, N. Y., assignor, by mesne assignments, to Curtiss-Wright Corporation, a corporation of New York Application December 14, 1934, Serial No. 757,434

7 Claims. (Cl. 89—44)

This invention relates to armament, particularly as it relates to the mounting of guns in aircraft.

Current practice in aircraft armament comprises the mounting of one or more machine guns of .30 inch caliber, either flexibly or fixedly. These guns are sufficiently small so that their recoil is not a serious factor requiring compensation; likewise the ammunition, usually arranged in belts comprising separable metal links, is readily handled by the gunner. It is also known that larger caliber guns of the "quick firing," as opposed to the "machine" type, have been proposed for aircraft use, these larger guns being mounted on recoil mechanisms analogous to those used in ground mounts.

Machine guns of the .50 inch caliber type, though well known as ordnance for ground use, have had little use in aircraft thus far, as their size lends them the characteristic of violent recoil. Since their rate of fire is high, it becomes necessary to provide specially designed mounting means, by which they maintain substantially the same maneuverability as the .30 caliber gun, while retaining their advantage of superior fire power. It is proposed to mount these larger guns on large aircraft, such as patrol flying boats, bombers and the like.

Objects of this invention are to provide a gun mount suitable for large caliber machine guns; to provide a recoil absorbing adapter for a large caliber machine gun; to provide a gun mount incorporating recoil-absorbing features which, however, maintains the simplicity of construction, lightness, dependability and ease of maintenance which has characterized gun mounts for smaller arms; to provide a large gun adapter which may be safely used on a gun mount primarily designed for smaller guns; to provide an improved ammunition container for machine gun ammunition; to provide a "saddle" type ammunition container arranged for attachment across the top of a gun, and having an integral compartment for the reception of elements of expended ammunition; and to provide an improved means for attaching a gun adapter to a gun mount.

A further object is to provide an improved trigger and aiming organization for large caliber machine guns.

Although the showings of the drawings relate primarily to gun mounts of the flexible type, it will be apparent that certain features of the invention are equally applicable to fixed gun installations.

The invention may be more clearly understood by viewing the annexed drawings, in which:

Fig. 1 is a plan of a gun mounted according to my invention;

Fig. 2 is a side elevation;

Fig. 5 is an enlarged perspective view of the gun cradle and flexible mounting yoke;

Fig. 6 is a fragmentary plan of a portion of the gun cradle;

Figure 3:
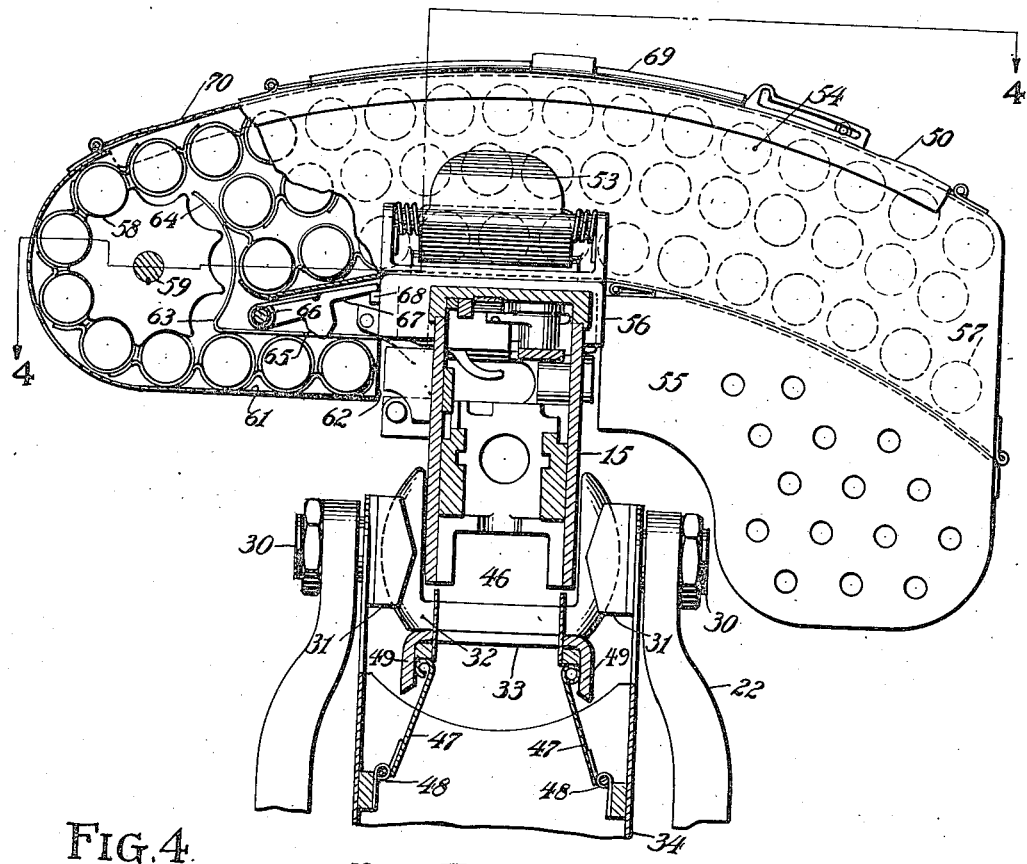
Fig. 3 is an enlarged section on the line 3—3 of Fig. 2.
Figure 4:
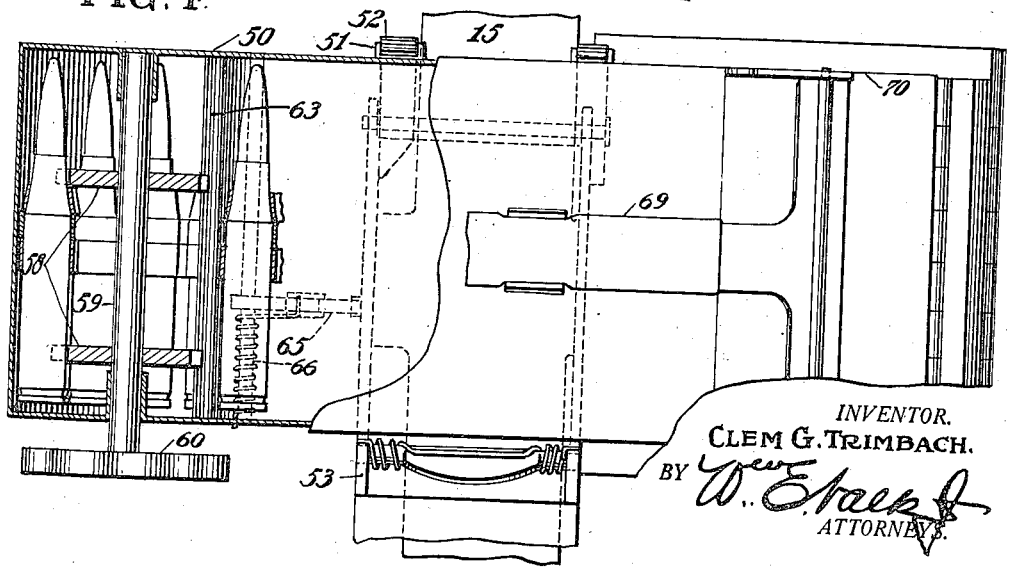
Fig. 4 is a section on the line 4—4 of Fig. 3.

Figs. 7 and 8 are sections on the lines 7—7 and 8—8, respectively, of Fig. 6;

Fig. 9 is a fragmentary plan of another portion of the gun cradle;

Figs. 10 and 11 are sections on the lines 10—10 and 11—11, respectively, of Fig. 9; and Fig. 12 is a fragmentary elevation, partly in section, of the gun holding yoke.

Briefly, the gun mount of this invention comprises a yoke having a central shank engageable with the more or less conventional socket of a flexible gun mount. Between the upper spaced ends of the yoke, a retrieving case for empty cartridge cases is swingably attached, and a pair of inwardly facing shoes carry a ring to which a gun cradle is fixedly attached. The cradle carries hand grips at one end thereof, and adjacent one of the handles, a trigger is mounted. The gun is carried by the cradle through mechanism by which the gun may reciprocate in a direction parallel to the line of fire. Thus, the recoil of the gun may be resiliently absorbed in large degree, lessening the strain on the gun mount, and substantially eliminating any reciprocative movement of the aiming handles and trigger when the gun is being fired. The trigger is connected by a flexible remote control to the gun firing mechanism. In addition, I provide a novel form of fastening device by which the shank of the yoke is retained in the gun mount socket. Likewise, I provide a novel form of ammunition container which may be called a "saddle" type container, the latter being provided with a retrieving case for the separable chain belt links ejected from the gun, and likewise being provided with means for charging ammunition from the container into the gun. I also provide means for holding the ammunition in its proper position while dismounted from the gun, this means being automatically disengaged from the ammunition when the container is installed in position on the gun.

The general organization of the gun mount is shown in Figs. 1, 2 and 5, wherein 15 is a gun of the .50 caliber machine type, having a silencer and recoil check 16, sights 17 and 18, firing mechanism 19, forward mounting lugs 20 and rear mounting lugs 21. A bifurcated yoke 22 is provided with a cylindrical shank 23 for engagement with a gun mount socket 24 (Fig. 12). The shank 23 is provided with a grooved extension 25 passing through an opening in the bottom of the gun mount socket 24. Within the groove of the extension 25, a substantially rectangular key 26 is inserted, this key having an elongated slot 27 engaged by a pin 28 anchored in the extension 25. The key 26 is movable between locking and unlocking positions, the locking position being shown in solid lines in Fig. 12, and the unlocking position in dotted lines. To lock the yoke 22 to the socket, after insertion of the shank 23 therein, the key is turned about the pin 28 and pushed laterally so that the upper surfaces of the key engage the lower surfaces of the socket 24. A spring-pressed pin 29 carried by the shank 23 engages a notch in the key to retain it in position. To disengage the yoke from the socket, the key 26 is pushed sideways and twisted downwardly, after which the yoke may be freely withdrawn.

At the upper ends of the yoke, aligned bolts 30 pass through the yoke ends and carry blocks 31 facing each other, each block being formed with an arcuate groove adapted to engage with a ring element 32 having side faces complementary to the grooves in the blocks 31. This ring element is riveted to a cradle 33 extending forwardly and rearwardly from the yoke. This organization of the mounting of the cradle with respect to the yoke permits of lateral tilting of the cradle, while elevation and depression of the cradle is provided through the medium of the bolts 30. Between the blocks 31 and the inner faces of the yoke ends, an ammunition retrieving case 34 is hung, this case having a capacity for empty cartridge cases substantially equivalent to the capacity of the loaded ammunition container hereinafter to be described. The cradle, at its rearward end, is provided with a pair of laterally spaced aiming grips 35 by which the cradle may be elevated or depressed about the bolts 30, or may be tilted by virtue of the mounting of the cradle with respect to the blocks 31, or may be traversed by virtue of the pivotal connection of the shank 23 in the socket 24. The cradle is provided with four substantially similar recoil-absorbing units 36, one pair being spaced ahead of the bolts 30, and the other pair being spaced behind the bolts 30. The forward and rearward units 36 are respectively laterally spaced from each other to accommodate the gun 15 therebetween. Each unit 36 comprises a cylindrical guideway 37 rigidly mounted on the cradle 33, each guideway having open guides within which a sliding block 38 may be inserted. Each block 38 may slide forwardly and rearwardly in the guideway 37, and springs 39 and 40 are placed between each end of the block 38 and the respective ends of the guideway 37. Each block 38 is provided with a central lateral bore to receive a bolt 41, one such bolt passing through the bores of the forward blocks 38, and another such bolt passing through the rearward blocks 38. The forward gun mounting lugs 20 are engaged by the forward bolt 41, and the rearward gun mounting lugs 21 are engaged by the rearward bolt 41. By this mounting arrangement, the gun, with the bolts 41 and the blocks 38, has a limited reciprocative movement forward and rearwardly, parallel to the line of fire of the gun. The springs 40 serve to check recoil of the gun, and the springs 39 serve to check counter-recoil of the gun. In actual practice, a .50 caliber machine gun has a recoil amounting to 490 pounds. This recoil is reduced by the recoil check 16 to the extent of 30%, and the recoil is further reduced by the recoil springs 40 to the extent of an additional 60%, making the net intensity of recoil, acting upon the yoke 22, 138 pounds. This amount of recoil may be readily assumed by the yoke and the balance of the gun mount, and approaches closely the same value which accrues in the mounting of a smaller .30 caliber machine gun rigidly mounted. Thus, the gun mount of this invention, comprising a cradle and recoil mechanism, may be used inter-changeably on those types of standard flexible gun mounts primarily designed for the .30 caliber machine gun.

The normal amount of recoil travel in accordance with a specific design of the springs 39 and 40, is on the order of three-quarters of an inch, this distance representing the movement of the gun with respect to the cradle 33. Since the aiming grips 35 are mounted on the cradle, they are not subjected to this violent movement, and the gunner, by aiming the cradle rather than the gun, is relieved of the intense gun recoil.

One of the grips 35 carries a finger trigger 44 connected by a flexible Bowden cable 45 to the gun actuating mechanism 19. Thus, the gun with all its fixed attachments, including the actuating mechanism, is movable with respect to the cradle, while the trigger is always movable with the cradle and not with the gun during reciprocation of the latter.

Referring to Fig. 3, it will be seen that the gun 15 is provided with a bottom opening 46, through which empty cartridges are ejected into the cartridge retrieving case 34. Since the gun is tiltable with repect to the case 34, though being movable therewith in elevation and depression, the top receiving opening of the case 34 is provided with baffles 47, spring-hinged at 48 to the case 34, and bearing outwardly against a fitting 49 movable in tilt with the gun. Thus, regardless of the angle of tilt of the gun, cartridge cases may be ejected from the gun into the retrieving case without danger of being lost or jammed in the mechanism.

A loaded ammunition case 50 is organized to straddle the top of the gun and to extend transversely on either side thereof. Lugs 51 on the container engage with fixed hooks 52 on the gun, at the forward side of the container, while lugs on the rearward side of the container are engaged by a releasing clip 53 carried by the gun. The container 50 comprises an upper compartment 54 containing belted ammunition, and with an integrally mounted lower container 55 for the reception of the separable belt links. The compartment 55 is located on one side of the gun opposite the belt link ejecting opening thereof, the compartment having an entrance opening for such links at 56. The compartment for loaded ammunition in the present embodiment is adapted to carry a loaded belt of forty-eight rounds of ammunition, the loaded belt starting at the point 57 and being laid in three alternate layers in the main body of the compartment. That end of the belt which feeds to the gun passes close to the inner surface of the outer wall of the compartment 54, and is laid over a star wheel organization 58 mounted on a shaft 59 extending through the side wall of the container. This shaft is provided with a hand wheel 60 by which the belted ammunition may be fed into the loading chamber of the gun when the container 50 is installed thereon. From the star wheel assembly 58, ammunition is directed through a chute 61 having a delivery opening 62 opposite the ammunition feed chute of the gun. This chute 61 is defined at its upper boundary by a baffle 63 which extends as a guard around the star wheel assembly 58 to a point 64 which is spaced from the top of the ammunition container a sufficient distance to permit the passage of the loaded belt thereby. The baffle 63 also serves to prevent the belt becoming fouled with the star wheel assembly when loading the container.

Since the .50 caliber ammunition is relatively heavy, it is desirable to provide means to prevent inadvertent displacement thereof from the container when dismounted from the gun, and also to hold the ammunition in such a position that when the container is mounted on the gun, the ammunition may be fed thereto with a minimum loss of time. To this end, a pawl 65 is hinged adjacent the exit opening 62 on a spring hinge 66, so that the pawl is engaged between two rounds of ammunition whereby the belt is firmly held in place. Upon mounting of the container on the gun, an extension 67 of the pawl 65 engages with a suitable lug 68 on the gun, lifting the pawl out of engagement with the ammunition and permitting it to feed freely to the gun.

The container 50 is provided with a suitable handle 69 carried by a hinged cover 70 which may be opened to permit loading of belted ammunition. In operation, a plurality of loaded cases 50 will be carried in suitable racks near the gun and after expenditure of the ammunition in any one case, the case is removed and replaced by another. The separable belt links will be kept in the compartment 55 of each case, so that when the cases are returned to the armory for recharging, the belt links may be there removed for re-use.

As previously pointed out in greater detail, the cradle organization of this invention permits the mounting of a large caliber machine gun on a gun mount primarily designed for smaller armament, and at the same time, permits the high degree of flexibility for the large caliber gun, of which the small caliber gun is capable. The cradle arrangement of this invention relieves from a gunner, and from the gun mount, excessive strains which would normally be expected in the mounting of a large gun, and thus permits greater accuracy of fire.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a machine gun mount, a cradle support, said cradle having a plurality of longitudinal guideways on each longitudinal side thereof and on opposite sides of said cradle support, an element mounted for reciprocation on each said guideway, a recoil and a counter recoil buffer acting between said cradle and the rearward and forward faces, respectively, of each said element, and a plurality of members each engaging a pair of said elements, reciprocable therewith, upon which a machine gun is adapted to be fixedly attached.

2. In a machine gun mount, a cradle, a pivotal support for said cradle, said cradle having spaced pairs of guideways, each pair comprising guideways on opposite sides of said support laterally spaced from one another and lying substantially at the edges of the cradle, an element mounted for reciprocation on each said guideway, abutments associated with each guideway ahead of and behind each said element, counter recoil and recoil buffers mounted between the respective abutments and each said element, and a cross member engaging the elements of each pair, so organized as to receive the mounting lugs of a machine gun.

3. In a gun mount, in combination, a cradle, a support for said cradle, pairs of longitudinally spaced axially parallel guides on said cradle and disposed on opposite sides of said cradle support, each pair comprising laterally spaced guides, an element longitudinally slidable in each guide, and a member joining the sliding elements of each pair of guides, said members being organized to receive a machine gun.

4. In a gun mount, in combination, a cradle, a support for said cradle, pairs of longitudinally spaced axially parallel guides on said cradle and disposed on opposite sides of said cradle support, each pair comprising laterally spaced guides, an element longitudinally slidable in each guide, a member joining the sliding elements of each pair of guides, said members being organized to receive a machine gun, and resilient means in each said guide acting upon said element to urge the latter toward a central position in the guide.

5. In a gun mount, in combination, a cradle, a support for said cradle, pairs of longitudinally spaced axially parallel guides on said cradle and disposed on opposite sides of said cradle support, each pair comprising laterally spaced guides, an element longitudinally slidable in each guide, a member joining the sliding elements of each pair of guides, said members being organized to receive a machine gun, resilient means in each said guide acting upon said element to urge the latter toward a central position in the guide, and aiming and firing means for the mounted gun carried directly on said cradle.

6. A mount for a gun having two pairs of laterally spaced mounting lugs, comprising a cradle, a forward and an after guide on each side of said carriage, each said guide having abutment means at each end, a spring in each end of said guide against the respective abutment means, means interposed between the springs in each said guide, a first transverse member connecting said interposed means in the two forward guides and a second transverse member connecting said interposed means in the two after guides, each of said transverse members cooperating with one of said pairs of lugs to mount the gun.

7. In a gun mount, in combination, a supporting yoke, a cradle pivotally supported by said yoke, said cradle having mounted thereon a plurality of axially parallel, longitudinally and laterally spaced guideways, said guideways being disposed on both sides of said cradle support, a member slidable in each guideway, means joining certain of said slidable members adapted to engage with portions of a mounted gun, and a coil spring for each guideway bearing at its one end on its associated slidable member and at its other end on an end of said guideway.

CLEM G. TRIMBACH.

REFERENCES CITED

The following references are of record in the file of this patent:

UNITED STATES PATENTS

| Number | Name | Date |
| --- | --- | --- |
| 1,483,987 | Rockwell | Feb. 19, 1924 |
| 1,735,164 | Green | Nov. 12, 1929 |
| 347,945 | Maxim | Aug. 24, 1886 |
| 453,702 | Maxim | June 9, 1891 |
| 1,722,190 | Bergmann et al. | July 23, 1929 |
| 1,757,244 | Green | May 6, 1930 |
| 987,166 | Peterson | Mar. 21, 1911 |
| 1,196,197 | Witherow | Aug. 29, 1916 |
| 1,288,372 | Bell | Dec. 17, 1918 |
| 1,302,436 | Rogers | Apr. 29, 1919 |
| 1,466,143 | Motta | Aug. 28, 1923 |

FOREIGN PATENTS

| Number | Country | Date |
| --- | --- | --- |
| 652,463 | France | Mar. 8, 1929 |
| 27,090 | Great Britain | Jan. 21, 1904 |
| 283,609 | Germany | Apr. 21, 1915 |
| 126,406 | Great Britain | May 15, 1919 |

OTHER REFERENCES

Photograph on page 1 of Aug. 12, 1917, issue of Washington Sunday Star of Interest.